(12) United States Patent
Reich et al.

(10) Patent No.: US 8,447,264 B2
(45) Date of Patent: May 21, 2013

(54) SYSTEM AND METHOD FOR CELL SECTOR CORRECTION

(75) Inventors: Don Reich, Thousand Oaks, CA (US); Kurt Warner, Carpinteria, CA (US); Jim DeArkland, Carpinteria, CA (US); Bruce Thomas, Santa Barbara, CA (US)

(73) Assignee: Boar's Head Corporation, Ventura, CA (US)

( * ) Notice: Subject to any disclaimer, the term of this patent is extended or adjusted under 35 U.S.C. 154(b) by 494 days.

(21) Appl. No.: 12/699,727

(22) Filed: Feb. 3, 2010

(65) Prior Publication Data

US 2010/0227586 A1    Sep. 9, 2010

Related U.S. Application Data

(60) Provisional application No. 61/149,628, filed on Feb. 3, 2009.

(51) Int. Cl.
*H04M 11/04* (2006.01)

(52) U.S. Cl.
USPC ............ 455/404.2; 455/404.1; 455/456.1; 455/456.6; 455/457; 455/445

(58) Field of Classification Search
USPC ............ 455/404.1, 404.2, 456.1, 456.5, 457, 455/445
See application file for complete search history.

(56) References Cited

U.S. PATENT DOCUMENTS

| | | | |
|---|---|---|---|
| 5,930,717 A | 7/1999 | Yost et al. | |
| 6,519,530 B2 | 2/2003 | Crockett | |
| 6,697,630 B1 * | 2/2004 | Corwith | ................... 455/457 |
| 7,031,714 B1 | 4/2006 | Rayburn | |

(Continued)

OTHER PUBLICATIONS

Luers, Method and Arrangement for Locating a Mobile Terminal in a Multicell Radio Arrangement, WO 2007/0258701 A1 published on Mar. 8, 2007.*

(Continued)

*Primary Examiner* — Justin Lee
(74) *Attorney, Agent, or Firm* — Brinks Hofer Gilson & Lione (57) ABSTRACT

A system and method for using location data from actual 911 cell phone calls, to determine the coverage areas (orientation and range) of any sector (antenna) in a cell phone system. This coverage area is typically described as the area enclosed by a circular sector with the antenna at the center of the circle. The physical locations of the actually received 911 cell phone calls are determined with respect to the physical location of the antenna. These locations are typically defined in terms of latitude and longitude. A percentage of locations of the origins of the cell phone calls that is desired to be captured by the area enclosed by the circular sector are determined. Two variables are used to adjust the capture of the desired number of calls—the length of the arc (expressed in terms of the percentage of phone calls enclosed by a given length) and the radius of the circle (range of the antenna) (again expressed in terms of the percentage of calls enclosed by the resulting area). The purported coverage area of the antenna is received from the cell phone service provider. The actual determined coverage area (including the locations of received calls) and the purported coverage area can be graphically represented on a single output. This output can be used by various agencies to determine the proper routing of future emergency 911 cell phone calls to Public Safety Answering Points (PSAP) to assist them in determining how cell phone calls to the antenna should be routed.

17 Claims, 8 Drawing Sheets

U.S. PATENT DOCUMENTS

| | | | |
|---|---|---|---|
| 7,072,666 | B1 | 7/2006 | Kullman et al. |
| 7,177,623 | B2 | 2/2007 | Baldwin |
| 8,086,252 | B2 * | 12/2011 | Luers .......................... 455/456.5 |
| 2005/0003797 | A1 | 1/2005 | Baldwin |
| 2008/0037461 | A1 | 2/2008 | Biltz |
| 2009/0044246 | A1 | 2/2009 | Sheehan et al. |
| 2009/0136011 | A1 | 5/2009 | Goel |

OTHER PUBLICATIONS

Hector Jasso et al., Prediction of 9-1-1 Call Volumes For Emergency Event Detection. 2007.

T. Vincenty, DMAAC Geodetic Survey Squadron, F. E. Warren AFB, Wyoming 82001, *Direct and Inverse Solutions of Geodesics on the Ellipsoid With Application of Nested Equations*, vol. XXIII, No. 176, Survey Review, Apr. 1975, Directorate of Overseas Surveys of the Ministry of Overseas Development, Kingston Road, Tolworth, Surrey, pp. 88-93.

N. I. Fisher, *Statistical Analysis of Circular Data*, Press Syndicate of the University of Cambridge, Cambridge University Press, The Pitt Building, Trumpington Street, Cambridge CB2 1RP, © 1993, Reprinted 1995, pp. 30-34, pp. 81-89.

\* cited by examiner

SYSTEM AND METHOD FOR CELL SECTOR CORRECTION

FIELD OF THE INVENTION

The present invention generally relates to systems and methods for correction of the direction and distance coverage of a cellular telephone antenna, and more particularly to a correction method that uses actual cell phone call location data to determine the actual direction and distance coverage of the cellular telephone antenna.

BACKGROUND OF THE INVENTION

Virtually since the invention of the telephone by Alexander Graham Bell in 1876, it has been recognized that a unique telephone number for notifying authorities of emergencies (crime, fire, injury . . . ) would be a tremendous boon to public health and safety.

Britain implemented its first emergency telephone system in 1937 using the number 999. This British system serving police, fire and Emergency Medical Service (EMS) was developed after fatal delays in phone calls reporting a fire on Wimpole Street. In 1957 the National Association of Fire Chiefs in the United States suggested a single number for reporting fires. In 1958 New Zealand instituted its 111 emergency telephone number. In 1959 the police department in Winnipeg Canada introduced North America's first emergency telephone system. President Lyndon Johnson's Commission on Law Enforcement and Administration of Justice issued a report in 1967 that recommended a single number for emergency calls that should be used nationwide.

In cooperation with AT&T (the predominant telephone carrier at that time), the designation of 911 as a universal emergency number was announced in January of 1968. The first 911 system was adopted in California in 1970. In the mid 1970s California's Alameda County launched the first 911 system that provided for selective routing of 911 calls. Prior to this pilot project, all 911 calls were routed according to "hard wired" instructions in the switching systems of the telephone companies. This original pilot program provided the county's Public Safety Answering Points (PSAPs) with the Automatic Number Identification (ANI) of the caller. This system did not provide for Automatic Location Identification (ALI) which would allow the PSAP to immediately and electronically identify the location of the originating landline telephone.

Although the selective routing of 911 calls has evolved and, for the most part, has worked very well for landline telephones, the prevalence of wireless communication devices (cell phones) presents new challenges.

The number of subscribers in the United States using wireless services grew from 55 million in 1997 to 253 million in 2007. Worldwide there are 2.3 billion wireless subscribers. 8% of the United States population uses cell phones with a volume of 2 trillion wireless minutes in 2007. 12.8% of United States households are "wireless only." Californians alone placed 23.3 million 911 calls in 2007. Of these, 11.6 million (50%) were made from wireless devices. Current estimates are that 58% of 911 calls are wireless.

The early development, deployment, evolution and growth of the wireless technology are highly relevant to the present invention. Many, if not the majority of original cell phone towers in the United States were placed along the major highways throughout the country. Part of the reason for this placement of towers was due to the existing right of way which facilitated their placement. The primary reason for their placement along highways though, was that most of the initial deployment of cell phones was in automobiles ("car phones").

As most emergency 911 calls from original wireless devices, car phones, originated on the highway, a completely rational decision was made to route these calls to the authority with the jurisdiction for responding to emergencies on the highways. Typically this was the Highway Patrol (e.g., California Highway Patrol (CHP) in California). For the most part, this system of routing wireless 911 calls to the Highway Patrol persists to this day. When fielding these wireless 911 calls approximately 95% are rerouted from the Highway Patrol to the appropriate PSAP that has jurisdiction over the emergency (e.g., local police department, fire department, sheriff, EMS . . . ).

As is readily appreciated, time is of the essence in many, if not most, emergency situations (e.g., a house fire). Often, a matter of minutes can literally mean the difference between life and death. As is further appreciated, the present system inherently induces a delay of the responders as the wireless 911 phone call must first be routed to the legacy entity (e.g., the Highway Patrol) and then subsequently routed to the appropriate responding PSAP.

Figure 1:
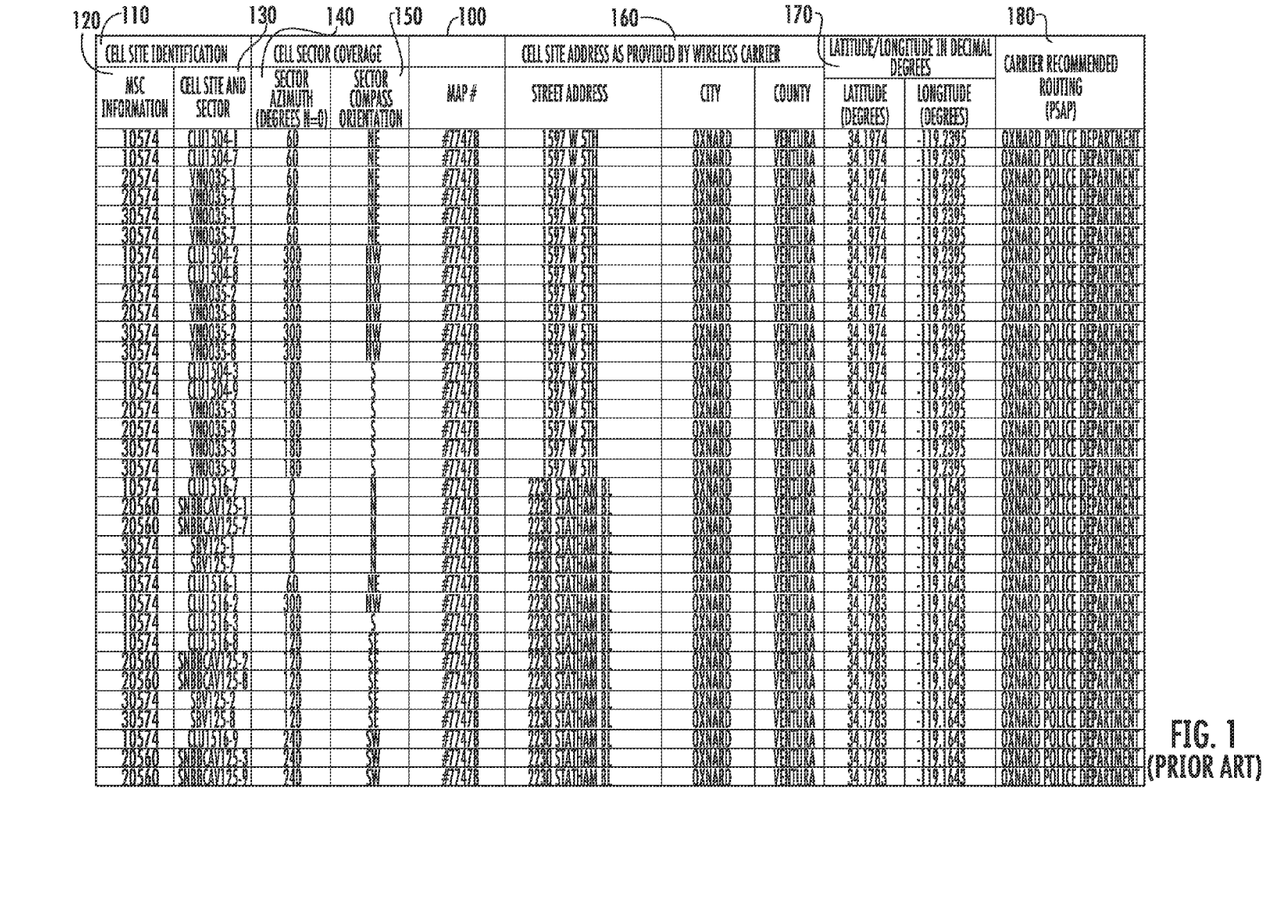
FIG. 1 illustrates a typical TVW table.

Cell phone providers, either themselves, or through contractors, place cell phone antennas either on towers or buildings or other such structures. The cell phone service provider maintains data which indicates the physical orientation of each of the cell phone antennas (known as sectors) in its network. FIG. 1 illustrates a typical Test Validation Worksheet (TVW) 100 from a cell phone service provider. The TVW 100 purportedly describes the direction (the coverage area) of installed cell phone antennas. The TVW 100 includes an identification of the cell site 110 which includes an identification of the specific antenna 120 and provider 130 operating on that antenna. The TVW 100 also includes the Sector (antenna) azimuth 140 and the Sector Compass Orientation 150 which purport to represent the physical orientation of the antenna. Columns 160 detail the street address, city and county location of the antenna, while columns 170 list the longitude and latitude coordinates of the antenna. Finally, column 180 lists a recommended PSAP to which e-911 calls should be routed on the assumption that the antenna is oriented in the direction indicated in the TVW 100.

This TVW 100 is given to the local agencies (Public Safety Answering Points (PSAPs), California Highway patrol, county coordinators) in order for them to determine the proper jurisdiction to which emergency phone calls received from the various sectors (antennas) of the cell phone networks are routed. As the jurisdictions for the emergency responding agencies are based on geographic boundaries, the sector information (orientation and range) is critical to the proper decisions in regard to the routing of calls to the appropriate responding agency. If the sector information (orientation and range) contained in the TVW 100 is inaccurate, the local agencies erroneously decide to route 911 emergency calls to improper responding authorities.

SUMMARY OF THE INVENTION

The present inventors have discovered that the sector information (orientation and range) contained in the TVW 100 contains inaccuracies and in some instances is completely wrong. As stated above, inaccuracies of the reported orientation leads to bad decisions as to how emergency 911 cell phone calls are to be routed. The inventors have made this discovery through the analysis of actual 911 cell phone calls received from a sector.

The analytical tools of the present invention, using location data from actual 911 cell phone calls, enables a very accurate determination of the actual coverage area (orientation and range) of any sector (antenna) in the cell phone system. This coverage area is typically described as the area enclosed by a circular arc with the antenna at the center of the circle. The system and method of the present invention plots the locations of the actually received 911 cell phone calls against a geographic map. The longitude and latitude coordinates of the antenna (typically a tower) and the data related to the actual phone calls received by that sector are received/read by the system. The system performs an initial analysis on all of the available call data to determine the maximum bearings and range of the call locations. Once the initial analysis is complete, the user has the opportunity further refine/explore the scope of the area covered by the antenna. To do so, the user is prompted to enter a percentage of phone calls that she desires to be captured by the area enclosed by the circular arc. In a preferred embodiment, the user is given two variables to adjust to capture the desired number of phone calls—the length of the arc (expressed in terms of the percentage of phone calls enclosed by a given length) and the radius of the circle (range of the antenna) (again expressed in terms of the percentage of calls enclosed by the resulting area).

As one output of the present invention, the system and method of invention furthermore generates a graphical representation (map) of the received phone calls as well as a depiction of the determined actual coverage area of the antenna. This output can be printed or used electronically by the parties responsible for determining the routing of e-911 calls.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

The system and method of present invention provides a tool for the appropriate governmental authorities to determine the proper routing of emergency 911 calls received by the emergency system from mobile devices such as cellphones. In the traditional landline system, the system knows the location of the landline via the ALI and the calls from these landlines can be automatically routed to the appropriate PSAP. Unlike traditional landline phones, however, the cellphone network switching system presently does not know the precise location from which cell phone calls are made. The system and method of the present invention is able to provide an accurate determination of the area from which a call is being made, based on the antenna (sector) on which an e-911 is received. This determination is made based on an analysis of a historical record of the location of the calls that were received by a particular antenna. With this determination in hand, the proper governmental authorities are able to determine which jurisdiction is appropriate for responding to calls from this area and direct the cellular network to route all future e-911 calls from this area to the PSAP responsible for this jurisdiction. Thus, the present invention provides a technical solution to a technical problem. As presently constituted, the determination of how to route e-911 calls to the first responders is based on an imprecise understanding of the coverage area of any given antenna. How to properly determine the coverage area of an antenna is a technical problem for which there is presently no know solution. The present invention provides that technical solution.

The system and method of the present invention generates a polygon, preferably a two dimensional cone (a sector of a circular) around a specified number (percentage) of points, both around the central angle and by distance from an antenna. The points represent the physical locations of e-911 cell phone calls actually received by that particular antenna. The present invention is capable of using a plurality of probability methods for determining the percentage of call locations that are enclosed by the cone.

The present invention operates on a database containing the "x-y" location of 911 cell phone calls actually received by a given antenna. This data is in a point layer view containing only the points to be analyzed. In one embodiment, the call data is contained in shapefile. As described herein, the data for only a single antenna is used and processed, however, as appreciated by those skilled in the art, the system and method can operate on data for any plurality of cell antennas. The call data, including location, is typically received from the cell phone providers (which operate the antennas) or their agents.

Figure 2:
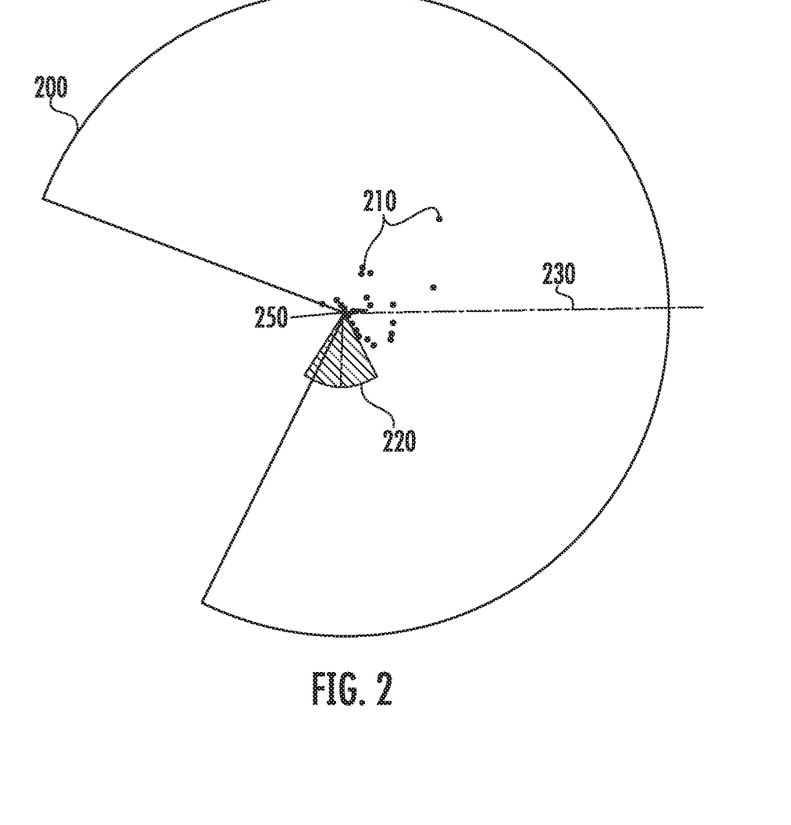
FIG. 2 depicts the initial graphical representation of the actually received calls.

For a given antenna, the system and method first perform an analysis on all of the data from the actually received calls for that antenna. This analysis takes the form of a circular statistical analysis of the call points 210. As illustrated in FIG. 2, this analysis determines a polygon 200 containing 100% of the bearings of the calls and 100% of the distances of the calls 210, relative to the center point 250—the antenna. Mathematically, the polygon is a sector of a circle with the antenna at its center. The two 'arms' of the sector are radii of the circle and the portion of the circle at it's circumference between the two radii is the arc. The two radii of sector 200 represent the extremes of bearings of the calls and the arc represents the call with the furthest distance. For ease of terminology herein, the sector shall often be denoted as a cone—given it's typical shape as illustrated in several of the Figures.

The system further determines the mean direction 230 (azimuth) of all the call points. This mean direction 230 alone is a very good indicator of the direction in which the antenna is actually pointing. The mean direction 230 might be off from the precise direction of the antenna due to population densities (i.e. more calls from a particular area, thus skewing the mean direction) or natural or man-made barriers (e.g. mountains, gulleys, buildings . . . ) The system further plots the sector coverage 220 provided for in the TVW 100. As clearly seen in FIG. 2, the vast majority of the calls received by the antenna 250 do not originate in the sector 220 indicated in the TVW 100.

The following describes the process the present invention executed in order to generate the coverage areas (typically cone shaped). As described above, the system creates two cones 220, 200. The first cone 220 represents the region that the cell tower is intended to serve, and is generated from the cell tower's coordinates, central bearing (degrees), bearing range (degrees), and distance (miles). The dashed line in the center of the cone 220 is drawn to represent the central bearing, and the line is extended 10% past the specified distance for aesthetic purposes.

The second cone 200 represents the region of call locations 210 the cell tower has actually served. The cone 220 is initially drawn as illustrated in FIG. 2 to include the entire set of call locations in a specified dataset. The system first calculates the mean direction $\bar{\theta}$ of the call locations with respect to the tower location (see Fisher, N. 1993. Statistical analysis of circular data. Cambridge University Press. New York, N.Y., USA. pp p. 31-34).

$$\text{Mean Direction } \bar{\theta} = \begin{cases} \tan^{-1}\frac{S}{C} & S > 0, C > 0 \\ \tan^{-1}\frac{S}{C} + \pi & C < 0 \\ \tan^{-1}\frac{S}{C} + 2\pi & S < 0, C > 0 \end{cases}$$

Where $$S = \sum_{i=1}^{n} \sin\theta_i$$

$$C = \sum_{i=1}^{n} \cos\theta_i$$

$\theta$ = Bearing to Point $i$, in Radians

The system adds the dashed line 230 to represent this mean direction, extended 10% past the greatest distance observed in the dataset.

In order to determine the range of observed values, the system splits the dataset using the reverse of this mean direction. For example, if the cloud of call locations had a mean direction of 90° (due East), then the system considers the opposite bearing at 270° (due West) to split the data. The bearing range starts at the bearing to the first point clockwise of this split bearing, and continues clockwise until it finds the last point. The system then draws a cone representing this range of bearings, reaching out to the distance of the farthest observed call location.

The system then calculates some statistics describing the distribution of call locations with respect to the cell tower:

Count=Number of observed call locations.

Start Angle=bearing to the first observed call location clockwise from the split bearing described above.

End Angle=bearing to the last observed call location after proceeding clockwise through all call locations. This is also equal to the first observed call location counter-clockwise from the split bearing described above.

Farthest Call=Distance to the farthest observed call location.

Mean Direction=Mean direction $\bar{\theta}$ defined above.

Rho=Mean Resultant Length $\bar{\rho}$, a measure of dispersion, calculated as (see Fisher (1993), p. 31-34):

$$\bar{\rho} = \frac{R}{n}$$

Where $R = \sqrt{S^2 + C^2}$ $n$ = Number of observed call locations $$S = \sum_{i=1}^{n} \sin\theta_i$$

$$C = \sum_{i=1}^{n} \cos\theta_i$$

$\theta$ = Bearing to Point $i$, in Radians

Kappa=Maximum Likelihood Estimate for Von Mises Concentration parameter (a measure of how concentrated the call locations are), calculated as (see Fisher (1993), p. 81-88):

$$\text{Kappa } \hat{\kappa}_{ML} \text{ approximated by} \begin{cases} 2\bar{\rho} + \bar{\rho}^3 + \frac{5\bar{\rho}^5}{6} & \bar{\rho} < 0.53 \\ -0.4 + 1.39\bar{\rho} + \frac{0.43}{1-\bar{\rho}} & 0.53 \leq \bar{\rho} < 0.85 \\ \frac{1}{\bar{\rho}^3 - 4\bar{\rho}^2 + 3\bar{\rho}} & \bar{\rho} \geq 0.85 \end{cases}$$

For small samples ($n \leq 15$), $$\hat{\kappa} \text{ adjusted by} \begin{cases} \max(\hat{\kappa}_{ML} - 2(n\hat{\kappa}_{ML})^{-1}, 0) & \hat{\kappa}_{ML} < 2 \\ \frac{(n-1)^3 \hat{\kappa}_{ML}}{n^3 + n} & \hat{\kappa}_{ML} \geq 2 \end{cases}$$

Where $n$ = Number of observed call locations $\bar{\rho}$ = Defined above

Angle Difference=difference (in degrees) between observed mean direction and the original bearing the tower was intended to serve.

Figure 3:
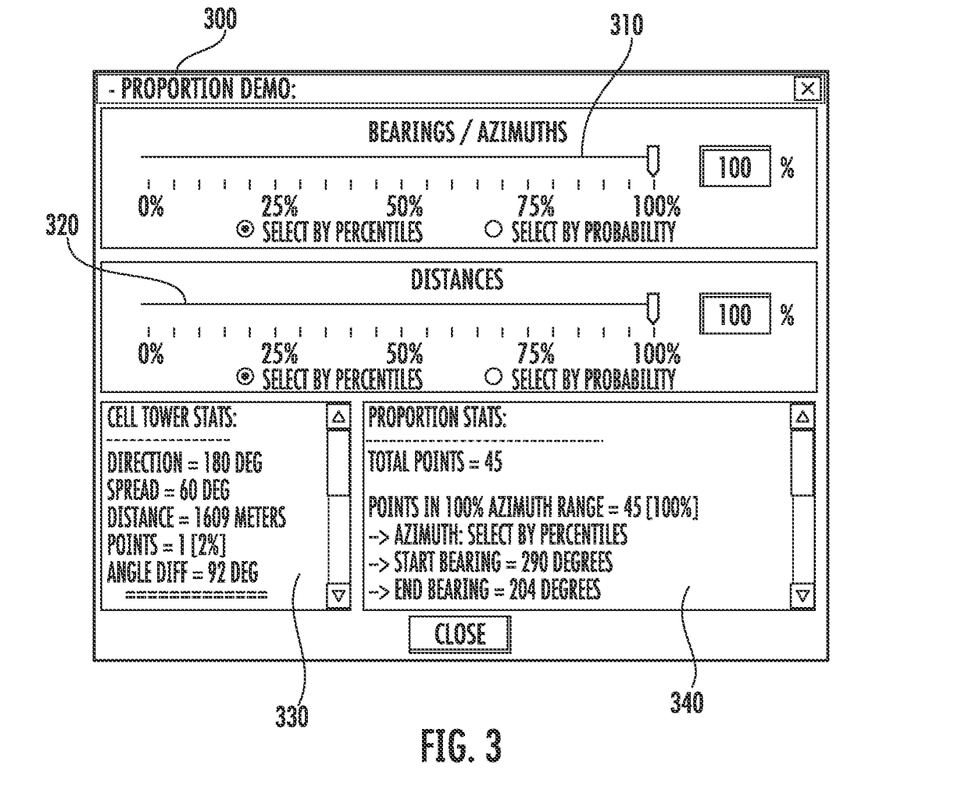
FIG. 3 illustrates an input screen of the graphical user interface of the present invention.

Once the system has performed the analysis and generated the representation depicted in FIG. 2, the user of the system is presented with the interface 300 illustrated in FIG. 3. Through this interface 300, the user can select, in terms of percentage of phone calls enclosed, the length of the arc and the radius of the circle of coverage. Slider 310 allows the user to adjust the percentage of calls that are encompassed by the two 'arms' of the polygon—indicating the bearings/azimuth of these arms. Slider 320 allows the user to adjust the distance of the projected coverage area of the antenna, again, as a function of the percentage of the number of calls falling within a particular distance. As shown in FIG. 3, the bearings 310 and distance 320 percentages are set to 100% after the system's initial analysis as the system determines a polygon 200 that encompasses 100% of all of the telephone calls received by the antenna (see FIG. 2).

FIG. 3 also depicts in area 330 the coverage area 220 (see FIG. 2) of the antenna predicted by the TVW. Area 340 details the determined coverage area generated by the present system including the total number of points under analysis, the number of points in the selected percentage coverage area, as well as the starting and ending bearings of the 'arms' of the cone.

Figure 4:
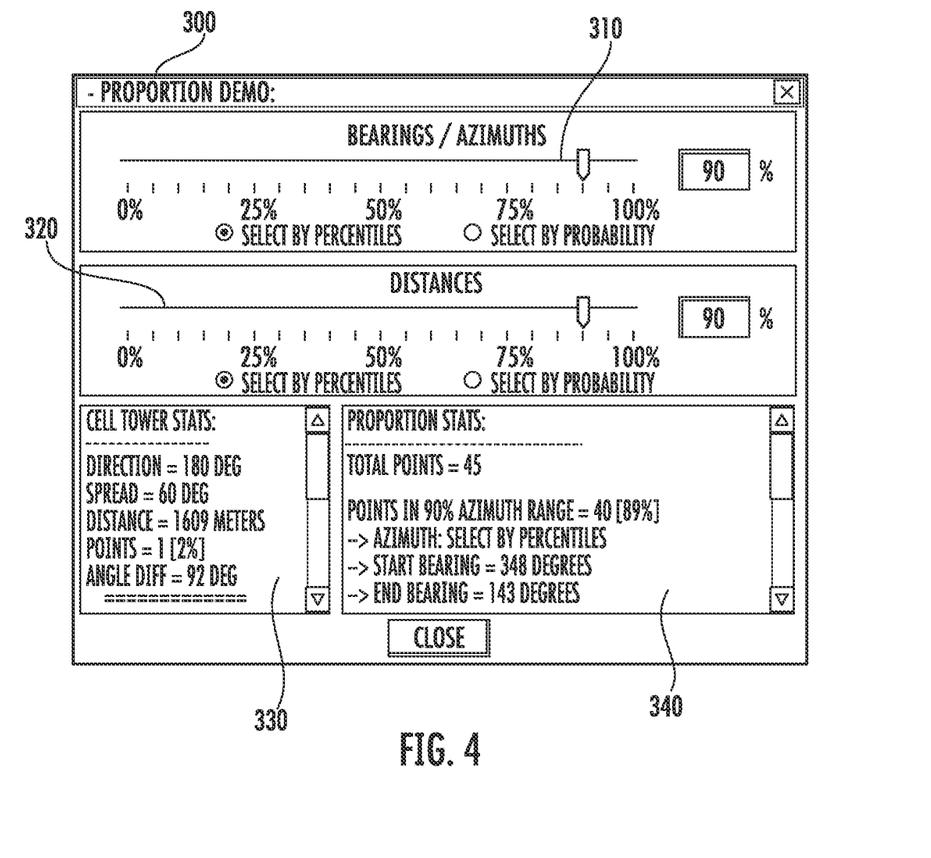
FIG. 4 illustrates the input screen of the graphical user interface of the present invention in which the user has selected to capture 90% of the received calls in a particular antenna.
Figure 5:
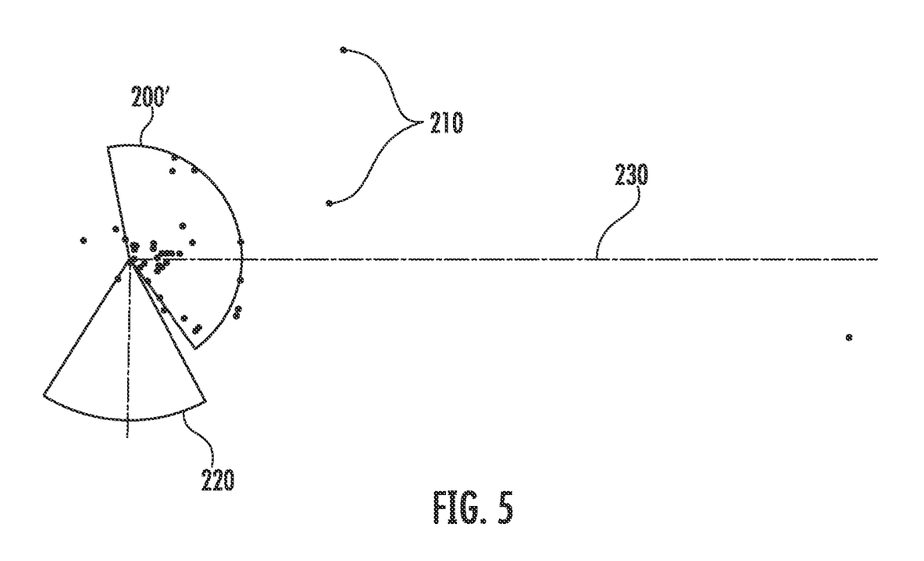
FIG. 5 depicts the graphical representation generated by the present invention, corresponding to the parameters specified by the user in FIG. 4.

FIGS. 4 and 5 illustrate an example of a user selecting to capture 90% of the received calls in azimuth and distance. As shown in FIG. 4, the user has moved the sliders 310 and 320 such that 90% of the points will be captured. The data in area 330 remains static as that is the reported antenna direction and distance. However, as seen in area 340, in the 90% coverage area chosen by the user, it can been seen that the coverage area now only encloses 40 of the received calls and the bearings of the two 'arms' have narrowed. FIG. 5 illustrates the 90% coverage area 200' selected by the user. As shown in this Figure, some of the calls 210 are not encompassed by the coverage area 200' and the radial arms of the coverage are 200' are much closer together. As appreciated by those skilled in the art, as the user adjusts the coverage area, the cone 200' will tend to center on the median direction 230 of all of the received calls.

Although depicted as cone shaped, the cones are actually polygons composed of a set of connected vertices. They are generated by first creating an empty polygon and then adding vertices to it in a clockwise direction. The first vertex is the cell tower location and the second vertex is located in the direction of the beginning the bearing range, at the specified distance. The system then generates a series of 75 new vertex points at that same distance from the cell tower, progressively moving in a clockwise direction until it reaches the end of the bearing range. The polygon is then closed by adding the cell tower location again.

The method of determining the location of a particular vertex, based on a specified distance and bearing, depends on the spatial reference of the data. If the data are projected, then the system uses plane trigonometry to convert the angle to radians and then to determine the vertex location. If the data are projected, then the well known Vincenty's algorithms are used to determine the vertex location.

Vincenty gives both "Direct" and "Inverse" formulae. The "Direct" formula calculates the position of the new point on the spheroid given an initial point, bearing and distance.

$\tan U_1 = (1-f)\tan\phi_1$ $\cos U_1 = \dfrac{1}{\sqrt{1+\tan^2 U_1}}$ (*Trig* identity; included by Veness [2007])

$\sin U_1 = \tan U_1 \cos U_1$ (*Trig* identity; included by Veness [2007])

$\sigma_1 = \arctan[2](\tan U_1, \cos\alpha_1)$ $\sin\alpha = \cos U_1 \sin\alpha_1$ $\cos^2\alpha = 1 - \sin_2\alpha$ (*Trig* identity; included by Veness [2007])

$A = 1 + \dfrac{u^2}{16384}\{4096 + u^2[-768 + u^2(320-175u^2)]\}$ $B = \dfrac{u^2}{1024}\{256 + u^2[-128 + u^2(74-47u^2)]\}$ $\sigma = \dfrac{s}{bA}$ (First approximation)

Initially set $\sigma' = 2\pi$ while $|\sigma - \sigma'| > 10^{-12}$ (Threshold suggested by Veness [2007]; $\cong$ 0.006 mm at equator)

$\cos(2\sigma_m) = \cos(2\sigma_1 + \sigma)$ $\Delta\sigma = B\sin\sigma\left\{\cos(2\sigma_m) + \dfrac{1}{4}B\left[\cos\sigma(-1+2\cos^2(2\sigma_m)) - \dfrac{1}{6}B\cos(2\sigma_m)(-3+4\sin^2\sigma)(-3+4\cos^2(2\sigma_m))\right]\right\}$ $\sigma' = \sigma$ (Introduced by Veness [2007])

$\sigma = \dfrac{s}{bA} + \Delta\sigma$

Loop until $|\sigma - \sigma'| \leq 10^{-12}$ $\phi_2 = \arctan[2]\Big(\sin U_1\cos\sigma + \cos U_1\sin\sigma\cos\alpha_1,$
$\qquad (1-f)\sqrt{[\sin^2\alpha + (\sin U_1\sin\sigma - \cos U_1\cos\sigma\cos\alpha_1)^2]}\,\Big)$ $\lambda = \arctan[2](\sin\sigma\sin\alpha_1, \cos U_1\cos\sigma - \sin U_1\sin\sigma\cos\alpha_1)$ $C = \dfrac{f}{16}\cos^2\alpha[4 + f(4-3\cos^2\alpha)]$ $L = \lambda - (1-C)f\sin\alpha\{\sigma + C\sin\sigma[\cos(2\sigma_m) + C\cos\sigma(-1+2\cos^2(2\sigma_m))]\}$ Reverse Azimuth $\alpha_2 = \arctan[2](\sin\alpha, -\sin U_1\sin\sigma + \cos U_1\cos\sigma\cos\alpha_1)$ $P_2 = (\phi_2, \lambda_1 + L)$ Arctan [2] Function Various functions in this extension calculate arctangents. However, there is a problem with the basic function arctan because it does not account for quadrant. For example, given that $\tan A = \dfrac{\Delta Y}{\Delta X},$ then $\arctan\dfrac{\Delta \cdot Y}{\Delta X} = A,$ where A is in radians. However, this simple arctan function does not properly account for the signs of $\Delta X$ and $\Delta Y$ and will only return values ranging between $\pm\pi/2$. The arctan [2] function checks the signs of $\Delta X$ and $\Delta Y$ and returns a value of A radians that correctly ranges from $-\pi$ to $\pi$.

Unfortunately, Visual Basic 6 does not have a function to calculate arctangent in this manner. Many programming languages such as C++, PHP, C# and VB.NET include the "atan 2" function which works. One simply specifies X and Y separately and the function determines the quadrant. Note: Microsoft Excel also has an "atan 2" function, but for some reason the Excel version takes the $\Delta X$ and $\Delta Y$ values in the order of (x, y) while all other implementations in the civilized world appear to take these values in the order of (y, x). Therefore one must be careful if this function is used in both the system and in Excel.

Given the lack of an Atan 2 function in VB6 and VBA, the function is preferably written as follows:

```
Const dblPi As Double = 3.14159265358979
Public Function atan2(Y As Double, X As Double) As Double
    If X > 0 Then
        atan2 = Atn(Y / X)
    ElseIf X < 0 Then
        If Y = 0 Then
            atan2 = (dblPi - Atn(Abs(Y / X)))
        Else
            atan2 = Sgn(Y) * (dblPi - Atn(Abs(Y / X)))
        End If
    Else    'IF X = 0
        If Y = 0 Then
            atan2 = 0
        Else
            atan2 = Sgn(Y) * dblPi / 2
        End If
    End If
End Function
```

Figure 6:
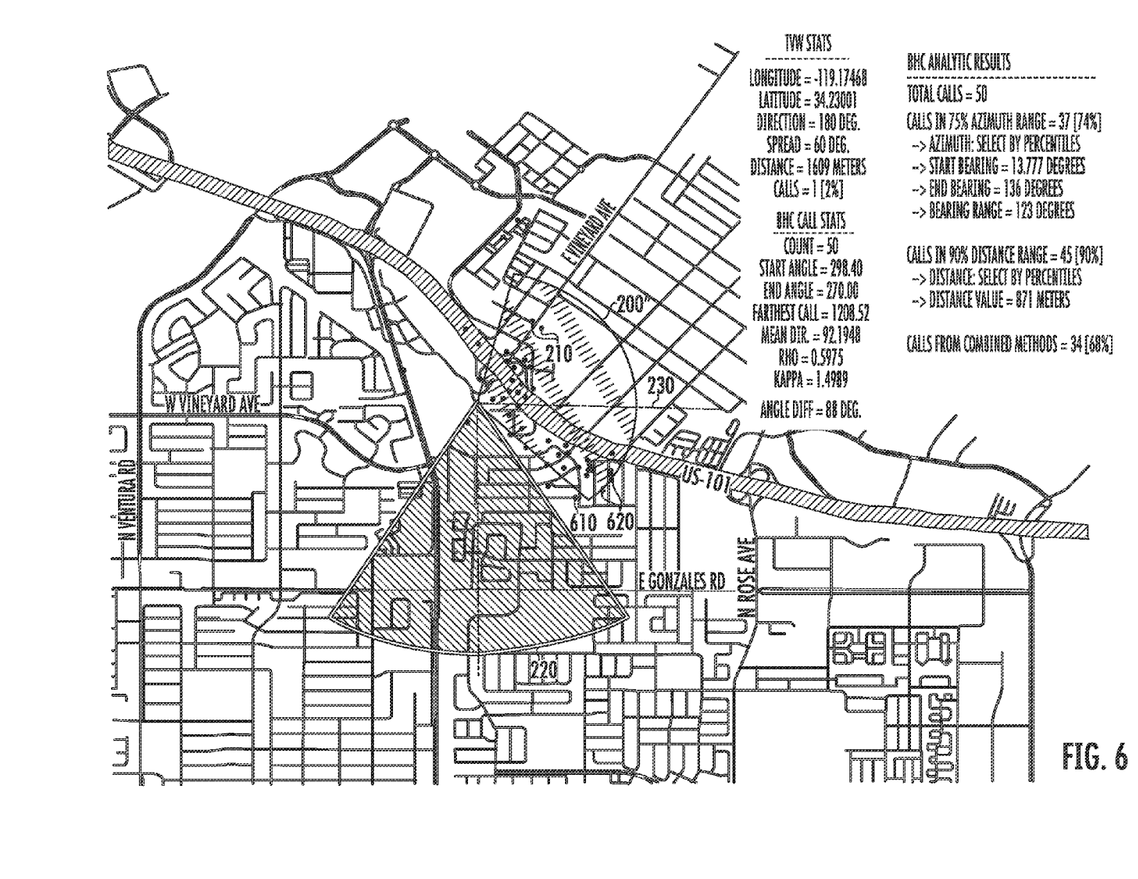
FIG. 6 illustrates an example of a graphical representation generated by the present invention overlaid on a geographical map.

FIG. 6 illustrates an example of graphical map generated by the system and method of the present invention which includes a street map. This output is the one preferably given to government authorities to assist in their determination of the proper routing of e-911 calls received by a particular antenna (sector). Looking at this map, the authorities can quickly and easily determine the proper jurisdiction (PSAP) to which such calls should be routed.

Again, area 220 is the coverage area taken from the TVW (FIG. 1) supplied from the cell phone service provider. Area 200" is the coverage area determined by the system and method of the present invention. As can be seen quite graphically from this map in FIG. 6, the purported direction of the antenna coverage area 220 given by the cell phone service providers is drastically different from the coverage area 200" as determined by the present invention from analysis of phone calls actually received by the antenna.

As this map shows quite clearly, antenna direction data (azimuth) from the cell phone service providers as illustrated in area 220 can be incredibly inaccurate. A map, similar to that of FIG. 6, but only illustrating coverage area 220 (not the calls 210 (610, 620) or the determined coverage area 200") is given to the local agencies (PSAPs, CHP, county coordinators) in order for them to determine how calls from this particular antenna are to be routed. Again, since the jurisdictional boundaries for the responding agencies (Fire, police and ambulance for example) are drawn on a geographic basis, the erroneous data of area 220 will lead the local agencies to make an erroneous determination to route the emergency 911 cell phone calls from this antenna to the wrong emergency service provider. As can be appreciated, in emergency cases, minutes, if not seconds, can mean the difference between life and death. Therefore, even the minor delay of routing the 911 call to the wrong agency which then has to transfer the call to the proper entity can be critical.

As further can be readily seen from FIG. 6, if the local agencies were provided the map which includes the area 200" generated by the present invention, they can make a proper determination as to which emergency service provider calls from this antenna should be routed.

As illustrated in this FIG. 6, the map further displays the location of 911 cell phone calls 210 that have been received by the antenna in the past. This map also contains text that describes the parameters used in generating the area 200". Specifically, the user indicated that she wanted to capture 75% of the phone calls in the azimuth range and 90% of the phone calls in the distance range. It is noted that calls 620 are not captured by area 200". In order to capture these two calls, the user would adjust the distance parameter using the interface described above to capture 95%, or so, of the phone calls. Similarly, to capture call 610, the user would increase the percentage of calls captured in the azimuth direction.

Figure 7:
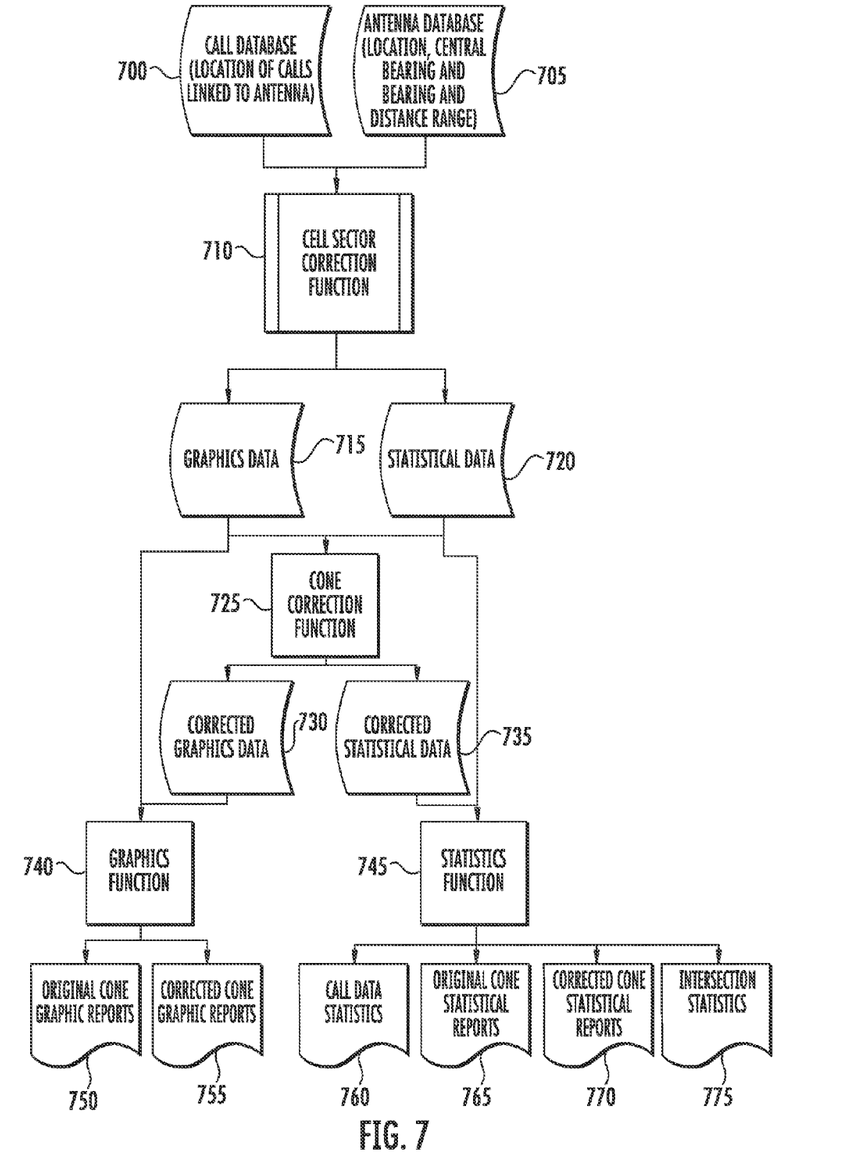
FIG. 7 depicts a system according the present invention.

FIG. 7 illustrates an embodiment of a system according to the present invention. Element 700 (1.) is a database that contains the location data for e-911 call received by a particular sector (antenna). As previously described, this data typically comes from the network providers—the ones who operate the antennas. Database 705 (2.) contains the contents of the TVW, including the locations of the cell antennas, their purported central bearings, and purported bearing and distance ranges. The Sector Generation Engine 710 is the main engine of the system of the present invention. In a preferred embodiment, this, and the other engines described herein, run on a computer system capable of handling a large amount of data and performing the statistical analysis and graphical functions described herein. The Engine 710 takes as input the call data from database 700 and the TVW data from database 705. The Engine 710 is communicatively coupled with the Databases 700 and 705. As the Databases 700 and 705 can reside remotely from the Engine 710 (or the computer containing the various engines of the system), the databases 700 and 705 can be accessed by the Internet, Ethernet or other similar communication media. Alternatively the databases 700 and 705 can be directly connected to the Engine 710 (the computer embodying the engines).

The Engine 710 performs the analytical and graphical processing as described herein and generates data to produce graphic and statistical outputs of the original cone/coverage area (determined by the input antenna data) and the data determined cone/coverage area. The graphics data for the original cone and the determined cone that captures 100% of the input calls is output in one database 715 and in a preferred embodiment, the output of the statistical data for the original cone and the cone that captures 100% of the calls is contained in a separate database 720.

Sector Revision Engine 725 allows, as described above with respect to FIGS. 4-6, the user to modify the cone that captures 100% of the calls (FIG. 2) to instead capture a user specified percentage of calls within the azimuth range and/or distance range (FIGS. 4-6). Sector Revision Engine 725 outputs to database 730 the graphics data for the cone that captures the specified percentage of calls within the azimuth range and/or distance range. Sector Revision Engine 725 also outputs to database 735 the statistical data for the cone that captures the specified percentage of calls within the azimuth range and/or distance range.

Report Engines 740 and 745 produce the actual data for final use by the user. Engine 740 produces the graphic outputs, while Engine 745 produces statistical outputs. Graphics Engine 740 has two primary outputs—the graphics 750 (representing the original cone as determined by the input antenna data from the TVW) along with its dashed line indicating the central bearing of the antenna; and the graphics 755 representing the cone produced by the user-specified azimuth/distance range and a dashed line indicating the mean direction of the call data. The Statistics Engine 745 generates report 760 that includes call count, start angle, end angle, distance of farthest call, mean direction of calls, rho, and kappa. It also generates report 765 with respect to the TVW defined cone that includes antenna longitude, latitude, direction, spread, distance range, and number of calls captured within its cone/coverage area. Report 770 is made with respect to the system generated cone (as modified by the user's parameters) and includes the number of calls captured within the user-specified azimuth range and the start and end bearings of these calls; includes number of calls captured within the user-specified distance range and the farthest distance of these calls; includes number of calls captured using both the user-specified azimuth range and the user-specified distance range. Finally, The Statistics Engine 745 generates report 775 that includes the square mileage of the original cone (TVW supplied), the corrected cone square mileage, and the intersection area between the original cone and corrected cone in square miles and as a percentage of the original cone/percentage of the corrected cone.

In a preferred embodiment, the system incorporates one or more display devices for displaying the outputs of the system, such as display screens or printers. In alternative embodiments, the outputs of the system can be in the form of files and/or databases that transmitted to remote locations or accessed from remote locations.

Figure 8:
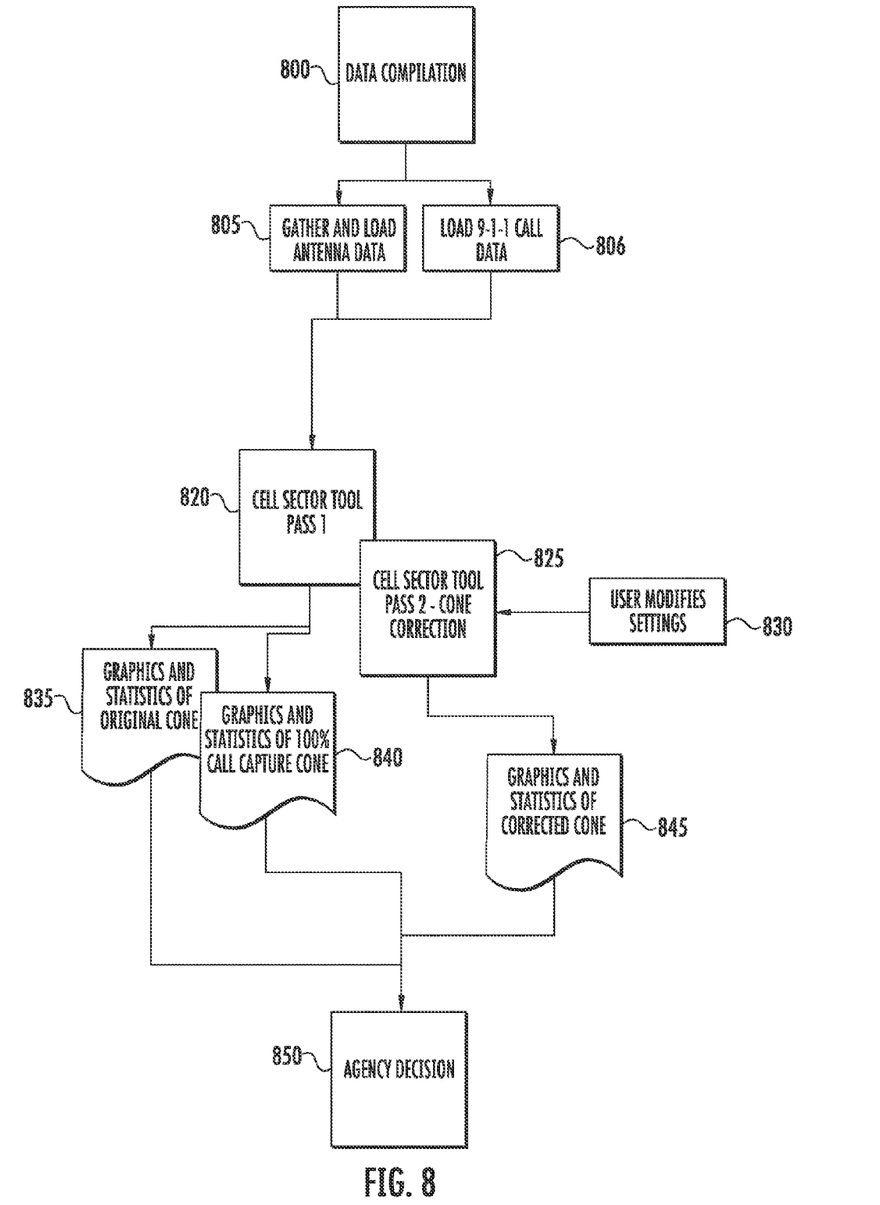
FIG. 8 is a flow chart illustrating the process of the present invention.

FIG. 8 illustrates a process of cell sector correction according to the present invention. As a first step 800 in the process, data for use by the system of the present invention is compiled This process involves gathering or receiving at least two types of data—antenna data and call data. In regard to the antenna data, this data is received and loaded into the system in step 805. As previously described, the antenna data is typically contained in the TVWs and is typically provided by the cell service providers. In step 810, the call data is received and loaded into the system. As previously described, the call data relates to the e-911 cell phone calls received by the antenna (sector) under analysis and includes the physical location of where the call originated. This call data is also typically provided by the cell service providers, but can be provided in some instances by the PSAPs. Both the antenna data and the call location data is preferably in a geographic coordinate system (i.e. latitude and longitude), but the system of the present invention is capable of processing location data in projected coordinate systems.

In step 820, the system performs the analysis and generates the representations described above in connection with FIG. 2. In step 835, the map and statistics of the TVW cone are output and in step 840, the map and statistics of the 100% coverage determined cone are output. Preferably, the graphics of the two cones are output on the same representation as illustrated in FIG. 2 for the ease of comparison.

As described above with respect to FIGS. 4 and 5, the user is given the ability to further refine the coverage area determined by the system of the present invention. In step 830, the user's input to how she would like the determined area modified is input into the system. As previously described, the user may change the azimuth range of the cone to capture a desired percentage of calls and/or the user may change the distance range of the cone to capture a desired percentage of calls In step 825, the modified coverage area is determined and output in step 845.

Finally, the outputs of the system of the present invention are delivered to the agency responsible for operating the 911 response system. With the output of the system of the present invention in hand, the agency is able to make an informed decision as to how e-911 calls received by particular antennas (sectors) should be routed.

Although described so far with respect to a single antenna, as appreciated by those skilled in the art the system can be operated in a batch mode in which call data from many different sectors are loaded into system all at once and analyzed together as a batch. Further, as appreciated by those skilled in the art, the present invention can be extended to provide three dimensional (3D) analysis if height data is made available. Presently antenna height, downtilt angle, etc., is not available in TVWs. For example a 3D analysis could show that the coverage area actually passes over a gully and does not include it. The attributes listed below, if they become available, could make the present system's sector corrections more accurate by adding: antenna height/downtilt data; Ground Elevation; Tower height; Observed height (amount to add to each point visible from tower); Height/elev units (feet, meters, etc.); Spot elevation (spot elevation for the tower); Vertical angle above (possible angle above the horizon compass degrees); Vertical angle below (possible angle below the horizon compass degrees); Inside radius (starting radius, if any, in feet or meters). These type of data have been suggested by the National Emergency Number Association (NENA).

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A method operable on a computer system for determining a coverage area of a cell phone antenna comprising:
    receiving call location data associated with a plurality of cell phone calls received by the cell phone antenna, the call location data indicating locations of the origination of respective cell phone calls;
    receiving antenna location data, the antenna location data indicating a location of the cell phone antenna;
    determining respective locations of the plurality of cell phone calls with respect to the location of the cell phone antenna;
    determining the coverage area of the cell phone antenna from the determined locations of the plurality of cell phone calls, the coverage area defining a region within which the plurality of cell phone calls emanated; and
    generating a graphical representation including the location of the cell phone antenna, the determined locations of the plurality of cell phone calls and the determined coverage area of the cell phone antenna;
    receiving input from a user; and
    revising the determined coverage area of the cell phone antenna in response to the user's input.

2. The method as recited in claim 1, wherein the act of determining the coverage area of the cell phone antenna further comprises
    determining a mean direction of the determined locations of the plurality of cell phone calls with respect to the location of the cell phone antenna;
    determining locations of cell phone calls most distant in bearing from the mean direction;
    determining a location of a cell phone call most distant from the location of the cell phone antenna; and
    generating a polygon encompassing the locations of the most distant cell phone calls in bearing and the location of the cell phone call most distant from the location of the cell phone antenna, wherein the polygon represents the coverage area of the cell phone antenna.

3. The method as recited in claim 2, wherein revising the determined coverage area comprises:
    revising the polygon representing the coverage area of the cell phone antenna in response to the user's input.

4. The method as recited in claim 3, wherein the user's input comprises a percentage of locations of a cell phone calls to be encompassed by the polygon representing the coverage area of the cell phone antenna and wherein the act of revising the polygon further comprises determining a revised polygon that encompasses the percentage of locations of a cell phone calls.

5. The method as recited in claim 4, wherein the percentage of locations of a cell phone calls input by the user is a percentage in terms of azimuth and a percentage in terms of distance.

6. The method as recited in claim 1, wherein the user's input comprises a percentage of locations of a cell phone calls to be encompassed by the determined coverage area of the cell phone antenna.

7. The method as recited in claim 1, wherein the call location data and the antenna location data is received from a cell phone service provider.

8. The method as recited in claim 1, wherein the act of determining the coverage area of the cell phone antenna further comprises determining the coverage area a sector of a circle with the location of the cell phone antenna as its center.

9. The method as recited in claim 1, further comprising:
receiving a purported coverage area of the cell phone antenna; and wherein the act of generating the graphical representation further comprises
generating the graphical representation including the purported coverage area of the cell phone antenna.

10. The method as recited in claim 1, wherein the plurality cell phone calls are cell phone calls to an emergency 911 system.

11. A method operable on a computer system for determining a routing of emergency 911 cell phone calls comprising:
receiving call location data associated with a plurality emergency 911 cell phone calls cell phone calls received by a cell phone antenna, the call location data indicating locations of the origination of respective emergency 911 cell phone calls;
receiving antenna location data, the antenna location data indicating a location of the antenna;
determining respective locations of the plurality of emergency 911 cell phone calls with respect to the location of the antenna;
determining a coverage area of the cell phone antenna from the determined locations of the plurality of emergency 911 cell phone calls, the coverage area defining a region within which the plurality of cell phone calls emanated;
generating a graphical representation including the location of the antenna, the determined locations of the plurality of emergency 911 cell phone calls and the determined coverage area of the cell phone antenna;
determining a jurisdiction encompassing the determined coverage area of the cell phone antenna; and determining a routing of future emergency 911 cell phone calls to the determined jurisdiction;
receiving a purported coverage area of the antenna; and
wherein the act of generating the graphical representation further comprises generating the graphical representation including the purported coverage area of the antenna.

12. A method as recited in claim 11 further comprising routing emergency 911 cell phone calls to the determined jurisdiction.

13. The method as recited in claim 11, wherein the act of determining the coverage area of the antenna further comprises
determining a mean direction of the determined locations of the plurality of emergency 911 cell phone calls with respect to the antenna location;
determining locations of emergency 911 cell phone calls most distant in bearing from the mean direction;
determining a location of an emergency 911 cell phone call most distant from the location of the antenna; and
generating a polygon encompassing the locations of the most distant emergency 911 cell phone calls in bearing and the location of the emergency 911 cell phone call most distant from the location of the cell phone antenna, wherein the polygon represents the coverage area of the antenna.

14. The method as recited in claim 11, further comprising:
receiving input from a user, where the user's input comprises a percentage of locations of a emergency 911 cell phone calls to be encompassed by the polygon representing the coverage area of the antenna; and
determining a revised polygon that encompasses the percentage of locations of a emergency 911 cell phone calls in response to the user's input.

15. A system for determining an actual coverage area of a cell phone antenna comprising:
a call database containing call location data associated with a plurality cell phone calls received by the cell phone antenna, the call location data indicating locations of the origination of respective cell phone calls;
an antenna database containing antenna location data, the antenna location data indicating a location of the cell phone antenna;
a computer communicatively coupled to the call data base and the antenna database, the computer configured to: determine respective locations of the plurality of cell phone calls with respect to the location of the cell phone antenna, determine the coverage area of the cell phone antenna from the determined locations of the plurality of cell phone calls, the coverage area defining a region within which the plurality of cell phone calls emanated, and generate a graphical representation including the location of the cell phone antenna, the determined locations of the plurality of cell phone calls and the determined coverage area of the cell phone antenna; and
an output device coupled to the computer, the output device displaying the graphical representation,
wherein the computer is further operable to receive input from a user and revise the determined coverage area of the cell phone antenna in response to the user's input.

16. The system as recited in claim 15 wherein the computer further comprises:
a sector generation engine that determines respective locations of the plurality of cell phone calls and determines the coverage area of the cell phone antenna; and
a report engine that generates the graphical representation.

17. The system as recited in claim 15, wherein the computer is further operable to receive a purported coverage area of the cell phone antenna and generate the graphical representation including the purported coverage area of the cell phone antenna.

* * * * *